Patented Dec. 26, 1933

1,941,188

UNITED STATES PATENT OFFICE 1,941,188

MANUFACTURE OF PLASTER OF PARIS

Wilbur S. Randel, Chicago, Ill., assignor to United States Gypsum Company, Chicago, Ill., a corporation of Illinois No Drawing. Application March 2, 1931
Serial No. 519,690

8 Claims. (Cl. 23—122)

This invention relates to the manufacture of plaster of Paris from natural anhydrite, or a mixture of natural anhydrite and gypsum.

Heretofore, various methods have been proposed for utilizing natural anhydrite, such as employing the anhydrite directly by grinding and mixing with an accelerator to produce a plaster without any calcination. It has also been proposed to utilize the anhydrite by hydrating the anhydrite in slurry form in the presence of excess water, either alone, or in combination with accelerator, followed by dewatering of the slurry and calcination in open pans, kettles or rotary calciners at ordinary or atmospheric pressure. I have found that a material economy in fuel required in the process of preparing plaster of Paris from hydrated natural anhydrite, is obtained by calcining the hydrated anhydrite with steam under pressure, rather than in open pans at atmospheric pressure.

An object of this invention, therefore, is to provide a process of producing plaster of Paris from natural anhydrite in which the anhydrite which has been hydrated to the di-hydrate is calcined under steam pressure; also to improve processes for the utilization of natural anhydrite and the production of plaster of Paris in other respects hereinafter specified and claimed.

In the utilization of natural anhydrite as a plaster by fine grinding and mixing with an accelerator, a plaster of good strength, but low consistency and poor plasticity, is obtained. The set of the plaster is also unduly prolonged and requires often several days to accomplish. In the process of utilizing anhydrite by hydration of the anhydrite slurry, by means of fine grinding with or without the addition of accelerator, followed by dewatering, drying and calcining at atmospheric pressure, the fuel costs for drying and calcining are high and the product is invariably of high consistency and produces a cast of low strength. The plaster can be utilized as a wall plaster, because of its plasticity and high consistency, if care is taken to limit the amount of sand added to it, but cannot be used when strength is required, such as in molding plaster, casting plaster, terra cotta plaster and plate glass bedding plaster.

The objections to the processes above have been successfully overcome by means of my present invention in which the calcination of the hydrated material is carried on under steam pressure. Furthermore, by regulation of the pressure of calcination, as disclosed in the Randel and Dailey application, Serial No. 384,343, filed August 9, 1929, variation in consistency and strength of the product may be obtained so that the plaster of Paris may be produced for any of the commercial uses to which the product is now put.

In carrying out the invention in practice, the anhydrite in slurry form, is hydrated to gypsum by grinding the anhydrite in the presence of water, and optionally in the presence of an accelerator solution or catalyzing agent. The desirable degree of grinding and the amount and nature of accelerator depend upon the speed of hydration desired. As a specific example of this portion of the process, the crude natural anhydrite is crushed in a gyratory crusher, further reduced in a hammer mill and finely ground in an air separating mill. To 100 parts of this finely ground anhydrite 100 parts of water and 2 parts of sodium acid sulphate are added. The slurry is then ball-milled to further reduce the fineness of the anhydrite and to facilitate hydration. The slurry is then held in a slurry tank for about 12 hours, when hydration will be found to be substantially complete. The gypsum thus formed, is then calcined as a slurry at a temperature between 227° F. and 365° F., or a corresponding steam pressure of 5 pounds per square inch gauge to 150 pounds per square inch gauge, the calcining pressure being selected, depending upon the consistency and strength desired in the resulting product. The slurry of gypsum is run into a boiler or autoclave, to which heat can be applied to raise it to the desired temperature. Steam can also be passed through the mixture until it is raised to the desired temperature, or steam may be used to heat a jacket surrounding the autoclave. Heat may also be applied directly to the outside of the autoclave by a flame of coal, gas or oil, bearing directly on the autoclave. The calcination period required is 3 to 7 hours, depending upon the conditions maintained during calcination.

In the process of treating gypsum with heat in the presence of water under pressure, a portion of the combined water of the gypsum is liberated as water or steam, and the crystalline hemihydrate $CaSO_4 \cdot \frac{1}{2}H_2O$ is formed, constituting what is commercially termed, plaster of Paris or calcined gypsum. In the calcination of gypsum at atmospheric pressure, the water liberated by the dissociation of the gypsum, is further reduced to steam or water vapor by heat applied to the gypsum, and this steam is dissipated to the atmosphere. In the pressure process as described, the vaporization of the liberated, combined water of the gypsum is eliminated, the water thus formed by dissociation of the gypsum being removed later in the process by centrifuging or filtration, thus effecting an economy in the fuel required for calcination.

By regulation of the steam pressure in the calcining autoclave, the consistency and strength of the product may be varied at will. The table below shows the results obtained by various pressures of steam:

| Steam pressure of calcination lbs. per sq. in. gauge | Properties of product | |
| --- | --- | --- |
| | Normal consistency cc. water/100 gms. | Compressive strength— #/sq. in. |
| 20 | 55 | 3500 |
| 40 | 65 | 2500 |
| 60 | 73 | 1800 |
| 80 | 80 | 1500 |
| 100 | 85 | 1200 |

The products obtained in the range of 80 to 100 pounds per square inch gauge steam pressure is suitable for use as wall plaster and in the manufacture of light weight partition tile. In the range of 40 to 60 pounds per square inch, a product suitable for molding plaster, casting plaster, gauging plaster and similar products is obtained. Around 20 pounds per square inch, a low consistency, high strength product is produced, suitable for load bearing building blocks, terra cotta and insulator mold plaster.

During calcination, the hydrated slurry may be agitated, or it may be ground during calcination to prevent the formation of lumps. This grinding may be accomplished by using a rotary cylinder heated either externally, or internally by the introduction of steam in any well known manner. The calcined gypsum slurry as described above, is treated in a filter press, centrifuge or other dewatering device, while the temperature of the mass is maintained sufficiently high to prevent rehydration of the calcined gypsum, in practice substantially in excess of 140° F., and the mass of calcined gypsum crystals is completely dried in a dryer, such as a rotary dryer. The dry product may then be further processed for use by grinding, addition to accelerator, retarder, hair, fiber, sand, etc., as is commonly done with plaster of Paris.

The pressure calcination may also be accomplished while the mass of hydrated anhydrite is held stationary. The resulting product is a rather hard mass of calcined gypsum which is broken up while hot, and then dried maintaining the temperature of the material above the rehydration point at all times. The dried material is then ground fine and is ready for use. This process has the advantage that a stronger product is produced as larger crystals of calcium sulphate hemi-hydrate are formed when the mass is held stationary during pressure calcination. This stationary calcination also makes unnecessary the mechanical dewatering step required when the calcined gypsum in slurry form.

It is to be understood that the setting time, strength and hardness of the resulting plaster of Paris may be varied in a measure by permitting the hydrating accelerator salt to remain in the slurry, or removing said salt by filtration and washing with additional hot water. Other salts, such as borax or potassium sulphate, may be added to the slurry and allowed to remain in the finished product to modify the properties thereof. It should be understood that the process described is equally applicable to pure mineral anhydrite and to mixtures of anhydrite and gypsum of varying proportion as they occur in nature. It should also be understood that the hot calcined slurry may be utilized by pouring it directly into molds and permitting it to cool and set to solid form. The latter forms the subject-matter of the co-pending case of Manvel C. Dailey, Ser. No. 536,456.

I would state in conclusion that while the examples described constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. The process of producing calcium sulfate hemihydrate which comprises subjecting calcium sulfate anhydrite to the combined action of water and attrition to hydrate the same to form calcium sulfate dihydrate, and heating the resulting slurry of calcium sulfate dihydrate under pressure to its calcination temperature.

2. The process of producing calcium sulfate hemihydrate which comprises subjecting calcium sulfate anhydrite while suspended in water to positive grinding action to hydrate the same to form calcium sulfate dihydrate in the form of a slurry, and subjecting said slurry to heat and pressure sufficient to convert the calcium sulfate dihydrate to the hemihydrate.

3. The process of producing calcium sulfate hemihydrate which comprises grinding calcium sulfate anhydrite suspended in water to form a slurry of calcium sulfate dihydrate, and thereupon subjecting the resulting slurry to the combined action of heat, pressure and positive grinding action to form calcium sulfate hemihydrate.

4. In the process of hydrating calcium sulfate anhydrite the step which comprises suspending said anhydrite in water and subjecting it to positive grinding action.

5. The process as defined in claim 4, when carried out in the presence of an hydration accelerator.

6. The process as defined in claim 4, when carried out in the presence of sodium acid sulfate as an hydration accelerator.

7. The process of producing commercial plaster of Paris from natural calcium sulfate anhydrite which comprises grinding said anhydrite while suspended in water to form a slurry of calcium sulfate dihydrate, and thereupon heating said slurry under a pressure of from 20 to 100 lbs. per square inch to a temperature sufficiently high to transform said dihydrate into the hemihydrate, and separating the latter from the water in which it is suspended at a temperature high enough to prevent its re-hydration to the dihydrate stage; and drying and grinding the resulting product.

8. The process as defined in claim 7, wherein the conversion of the dihydrate into the hemihydrate is accompanied by positive grinding of the dihydrate contained in the slurry.

WILBUR S. RANDEL.